United States Patent
Kothadia et al.

(10) Patent No.: US 9,518,664 B2
(45) Date of Patent: Dec. 13, 2016

(54) COMBINATION SEALING ARRANGEMENT FOR ROTARY BALL VALVE

(71) Applicant: ROTEX MANUFACTURERS AND ENGINEERS PRIVATE LIMITED, Dombivali East, Maharashtra (IN)

(72) Inventors: Ajit Kothadia, Mumbai (IN); Amit Shah, Mumbai (IN)

(73) Assignee: Rotex Manufacturers and Engineers Private Limited, Dombivalia East, Maharashtra (IN)

( * ) Notice: Subject to any disclaimer, the term of this patent is extended or adjusted under 35 U.S.C. 154(b) by 0 days.

(21) Appl. No.: 14/797,211

(22) Filed: Jul. 13, 2015

(65) Prior Publication Data

US 2016/0327167 A1    Nov. 10, 2016

(30) Foreign Application Priority Data

May 4, 2015    (IN) .......................... 1765/MUM/2015

(51) Int. Cl.
    *F16K 5/06*    (2006.01)

(52) U.S. Cl.
    CPC .............. *F16K 5/0663* (2013.01); *F16K 5/06* (2013.01); *Y10T 137/0508* (2015.04)

(58) Field of Classification Search
    CPC ..... F16K 5/0663; F16K 5/06; Y10T 137/0508
    USPC .................... 251/314–317; 137/15.22, 15.18
    See application file for complete search history.

(56) References Cited

U.S. PATENT DOCUMENTS

| | | | |
|---|---|---|---|
| 2,480,529 A | 8/1949 | Waag | |
| 2,989,990 A * | 6/1961 | Bass | F16K 5/0668 251/317 |
| 3,269,692 A * | 8/1966 | Shafer | F16K 5/0673 251/317 |
| 3,445,087 A | 5/1969 | Priese et al. | |
| 3,554,485 A | 1/1971 | Richards | |
| 3,604,682 A | 9/1971 | Richards | |
| 3,729,015 A | 4/1973 | Oliver | |
| 4,111,393 A | 9/1978 | McClurg et al. | |
| 4,135,545 A | 1/1979 | Fowler et al. | |
| 4,286,614 A | 9/1981 | Kacal et al. | |

(Continued)

FOREIGN PATENT DOCUMENTS

| | | |
|---|---|---|
| CN | 201069001 Y | 6/2008 |
| EP | 1680614 A1 | 7/2006 |
| EP | 2341269 A1 | 7/2011 |

*Primary Examiner* — John Bastianelli

(57) ABSTRACT

A rotary ball valve with an improved sealing arrangement, comprising of a valve body and a rotary ball, the rotary ball valve has a plurality of combination sealing arrangement comprising of a polarized combination cavity having a non-parallel slot and an extended groove, an add-on sealing ring and a compatible seat ring having a plurality of non-parallel concentric surfaces, when assembled. The compatible seat ring has a compatible profile so as to create a positive isolation by a surface contact between the add-on sealing ring and the extended groove and create another positive isolation by a surface contact between the add-on sealing ring and the compatible seat ring. The positive isolation prevents leakage during thermal cycling, pressure variations. The non-parallel slot and the compatible sealing ring therein prevents dislodgement of the seat ring; even in double block and bleed condition.

19 Claims, 14 Drawing Sheets

(56) References Cited

U.S. PATENT DOCUMENTS

| | | | |
|---|---|---|---|
| 4,335,748 A | | 6/1982 | Olansen et al. |
| 4,423,749 A | * | 1/1984 | Schmitt ................ F16K 5/0689 251/315.11 |
| 4,606,368 A | * | 8/1986 | McCafferty ........... F16K 27/062 137/15.22 |
| 4,781,213 A | | 11/1988 | Kilayko |
| 4,911,408 A | | 3/1990 | Kemp |
| 5,275,191 A | * | 1/1994 | Bernard ................ F16K 5/0684 137/15.22 |
| 6,669,171 B1 | | 12/2003 | Stunkard |
| 6,948,699 B1 | | 9/2005 | Keiser |
| 8,328,160 B2 | | 12/2012 | Abel et al. |
| 8,398,053 B2 | | 3/2013 | Ezekiel |

\* cited by examiner

COMBINATION SEALING ARRANGEMENT FOR ROTARY BALL VALVE

FIELD OF INVENTION

This invention generally relates to rotary ball valves for fluid flow control. Particularly, the invention relates to sealing in rotary ball valves. More particularly this invention relates to sealing arrangement in rotary ball valves used for fluid flow control.

BACKGROUND OF THE INVENTION

A rotary ball valve is a valve having a spherical ball that controls the flow of a fluid through it. The spherical ball has a through path or bore, which, when is co-axial with the inlet and outlet port of the valve leads to opening of the valve, allowing the flow of the fluid to occur. In the closed position, the through path or bore is substantially at right angle with the inlet and outlet port of the valves. The ball valve, for the purpose of describing present invention, could be either a trunnion ball valve or a floating ball valve, or an improvisation of either.

The direction from which flowing fluid approaches the ball is generally known as an upstream while the direction away from the ball, along which a flowing fluid leaves the valve, is known as a downstream.

In a trunnion ball valve, the ball is anchored on bearing or on pivot whereas its seals float. The seals in the trunnion valve are externally energized using springs. As the seal floats under fluidic pressure the upstream seal presses against the ball and it is therefore active, while the downstream seal is inactive. In a floating ball valve, wherein the ball floats and the seal is firmly held in the body, the seals are self-energizing. As the ball floats under fluidic pressure the downstream seal is active while the upstream seal is inactive.

In both the cases, whether trunnion ball valve or floating ball valve, one of the main requirements is that the rotary ball valve does not leak, and particularly, no fluid reaches the downstream side when the valve is closed. Leakage is most probable between joints and between relatively moving components.

The leakage is prevented by providing sealing between the two joining parts or two relatively moving parts. The seal is generally of an elastomeric material, which is relatively softer than metallic materials, of which are made the ball, valve body, operating shaft and other parts of the rotary valve.

Patent Publication No: CN 201069001Y claims to disclose a fixed ball (trunnion) type zero-leakage ultra-high-pressure ball valve wherein seal of different locations within a valve are generally described, for example, use of elastomeric seal at fixed and moving joints, O-ring at the rotating shaft, et cetera, though the novel and inventive aspect of the disclosure is not quite clear.

U.S. Pat. No. 3,554,485 is one such earlier invention disclosing a seal in the form of a seat ring to seal against the surface of the ball along with a seat-retaining ring, supporting said seat ring. The disclosure mentions a seat ring and a wedge ring, both preferably of Polytetrafluorethylene, commonly known as PTFE.

Use of O-ring in general and for sealing in rotary ball valves is known. This is illustrated in U.S. Pat. Nos. 3,445,087, 2,480,529, 4,111,393, 4,781,213, 4,911,408, 6,948,699B1, Patent Application No: US201201120110 and Patent Application No: EP2341269A1 that deploys O-ring for sealing stationary joint or moving component, whether stand alone or in combination with seat ring. U.S. Pat. No. 4,335,748 which describes a disc valve, also uses O-ring, and this patent is cited here merely to amply illustrate the generic application of O-ring.

There are valve designs for use in extreme conditions. Example: Valves that can be used to carry fluids at high temperature, of the order of 500° C., and or valves that carry inflammable fluids wherein sealing is also expected to prevent spread of fire once the valve is closed. U.S. Pat. No. 4,286,614 and U.S. Pat. No. 6,669,171B1 describe such ball valves which are capable of sealing effectively against fluid leakage in the presence of fire conditions by providing a metal to metal sealing after the elastomeric seal has burnt away due to fire. U.S. Pat. No. 4,911,408 in addition, facilitates top assembly of the ball. U.S. Pat. No. 8,328,160 divulges valve for another extreme condition when cryogenic fluids are handled and the ball valve needs to provide sealing at temperatures of about minus 250° C.

As indicated above, in a floating ball valve or in a trunnion ball valve, the effective sealing takes place only either at upstream side or a downstream side. In other words the blocking action is achieved at one side only. If the seal of that side leaks, then the rotary ball valve loses the very purpose of its deployment. To counter this situation, there are disclosures to invent combination valves which are a modification of a floating ball valve and a trunnion ball valve. Patent application No: EP1680614A1, also published as WO2006024860A1 describes a double block valve wherein seals of both sides, that is, the upstream side as well as the downstream side contribute in sealing the flow of fluid. The disclosure also includes relief valves. While the aim of the disclosure appears to prevent leakage, the disclosure does not include nor address a seal design as such. U.S. Pat. No. 8,398,053B2 also discloses an arrangement for both side sealing with respect to the ball. Such designs are known as double block type and are generally provided with a bleed valve, referred to as relief valve above.

Whether single or double sealing, the construction and fitment of the seal is important factor. The seal itself should not distort under pressure. U.S. Pat. No. 3,604,682 discloses a wedge assembly comprising of a sealing ring and backing ring to prevent displacement of the sealing ring. The wedge seal assembly has conical mating faces of the sealing ring and the backing ring, and includes a complementary inter-fitting ridge and recess thereon.

Dislodging or loosening of the seal under pressure is a known field problem. U.S. Pat. No. 4,135,545 provides a non-metallic seal for a valve seat assembly which has a substantial resistance to being blown out during high velocity low rate conditions by swaging of the metallic seat member to lock the non-metallic seat member in place.

U.S. Pat. No. 3,729,015 discloses a rotating seat so as to distribute the wear pattern thereby enhancing the life and effectivity of the seal.

U.S. Pat. No. 4,111,393 discloses a removable seal in order to facilitate repair of the valve.

One of the practical situations, which is unaddressed by prior art, is effectivity of seal under wide variation of temperature. The seal loosens in its seat, due to thermal cycling. The situation worsens in case of double block and bleed condition. While a sealing may be effective at a particular temperature and pressure, it may not be suitable when the pressure and temperature vary, even if below or within the highest value for which a sealing of a valve is designed.

Thus there is a need in the art to develop effective sealing between a ball and the seat for a ball valve assembly for preventing fluid leakage under ambient temperature variation and under temperature variation at higher pressure as well as at low pressure. The present invention addresses the above mentioned need effectively.

OBJECTIVE OF THE INVENTION

The objective is to invent a sealing arrangement for a rotary ball valve such that fluid does not leak from the seal arrangement itself due to temperature and pressure cycling.

Another objective is to invent a sealing arrangement for a rotary ball valve which can withstand excessive pressure in valve in double block and bleed condition.

SUMMARY OF THE INVENTION

A combination sealing arrangement for rotary ball valves is disclosed. A rotary valve has a combination sealing arrangement on the upstream side and another combination sealing arrangement on the downstream side. The combination sealing arrangement comprises of a plurality of seat support having a polarized combination cavity, in which is assembled an add-on sealing ring and a compatible seat ring having a plurality of non-parallel concentric surfaces, when assembled. The compatible seat ring is of a relatively tougher elastomer like PTFE while the add-on sealing ring is made of VITON or neoprene or equivalent synthetic rubbers considering fluid compatibility as per the application. This implies that when the add-on sealing ring and the compatible seat ring are pressed together against each other, the add-on sealing ring shall elastically deform.

The compatible seat ring has a compatible profile so as to create a positive isolation by a surface contact between the add-on sealing ring and an extended groove and create another positive isolation by a surface contact between the add-on sealing ring and the compatible seat ring.

The polarized combination cavity has a non-parallel slot and an extended groove. The extended groove is such that when an add-on sealing ring is slipped in the polarized combination cavity, the add-on sealing ring shall have the tendency to stay in the extended groove, and the add-on sealing ring shall slightly project into the non-parallel slot.

The polarized combination cavity further comprises of the non-parallel slot. The non-parallel slot is of an entrance width which less than a thickness of the compatible seat ring and the compatible seat ring is having a plurality of parallel concentric surfaces initially. The entrance width is merely marginally less than the thickness such that the compatible seat ring can be force fitted in the non-parallel slot.

The root width of the non-parallel slot is more than the entrance width of the non-parallel slot as well the thickness of the compatible seat ring.

To assemble the combination sealing arrangement, first of all the add-on sealing ring is slipped in to the extended groove. As is known, the add-on sealing ring is merely stretched slightly and just left in the extended groove and the add-on sealing ring slips in the extended groove due to commensurate profile of the extended groove.

The compatible seat ring is pre-heated so as to temporarily reduce its intrinsic hardness to about 20% to 50% and then force fitted into the non-parallel slot by applying a force FF on the face of the compatible seat ring. Since the root width of the non-parallel slot is more than the entrance, the compatible seat ring swells while the force FF is applied on the face and the compatible seat ring fills and fits in the non-parallel slot non-reversibly and turns into a compatible seat ring having a plurality of non-parallel surfaces.

Consequent to applying the force FF on the face of the compatible seat ring, the face gets irregular and deformed, which is subsequently machined as per the curvature of the rotary ball, so as to create a perfect sealing between the face of the compatible seat ring and the rotary ball.

The add-on sealing ring, when assembled, applies a first push force F1 on the extended groove and a second push force F2 on the compatible seat ring. The seat ring with non-parallel concentric surfaces, when assembled, exerts a third push force F3, an outward force F4 and a fourth push force F5. The outward force F4 results into a reaction force F4R with a tendency to push the compatible seat ring out of the non-parallel slot. However, the non-parallelity of the non-parallel slot effectively neutralizes the reaction force F4R. Consequently, in spite of thermal cycling, although the leakage path still gets created and the compatible seat may be loosened, however, the compatible seat ring stay puts in its position and does not dislodge outwards.

Consequent to the first push force F1 and the second push force F2, there remains a positive isolation due to a surface contact in the groove region between the add-on sealing ring and the extended groove, and at region of contact between the add-on sealing ring and the seat ring.

In case of a trunnion type rotary valve, even when thermal cycling causes the leakage path around the compatible seat ring in the upstream side, the positive isolation in the groove region and at the region of contact breaks the continuity of the leakage path and thus leakage is prevented.

In case of a floating type rotary valve, even when thermal cycling causes a leakage path around the compatible seat ring in the downstream side, the positive isolation in the groove region and at the region of contact breaks the continuity of the leakage path and thus leakage is prevented.

In double block and bleed condition, even when thermal cycling causes a leakage path around the compatible seat ring, the compatible seat ring stay puts in its position due to non-parallel surfaces; and the positive isolation in the groove region and at the region of contact prevents leakage. Consequently, the seat ring is momentarily pushed back due to pressure spike, permitting the desired bleed action of fluid flowing from in-between the face of the compatible seat ring and the rotary ball.

There are several possible profiles of polarized combination cavity with different embodiments of add-on sealing ring and at different locations in the polarized combination cavity. The add-on sealing ring can be of any shape, like an O-ring, a non-circular gasket or any combination thereof.

The term extended groove signifies a room for an add-on sealing ring, the room can be within the slot or outside the slot.

DETAILED DESCRIPTION OF INVENTION

The preferred embodiment of present invention is described with the aid of the drawings. Several variations of present invention are possible and therefore the description of the embodiments should not be construed to limit the scope of this invention in any manner.

Figure 1:
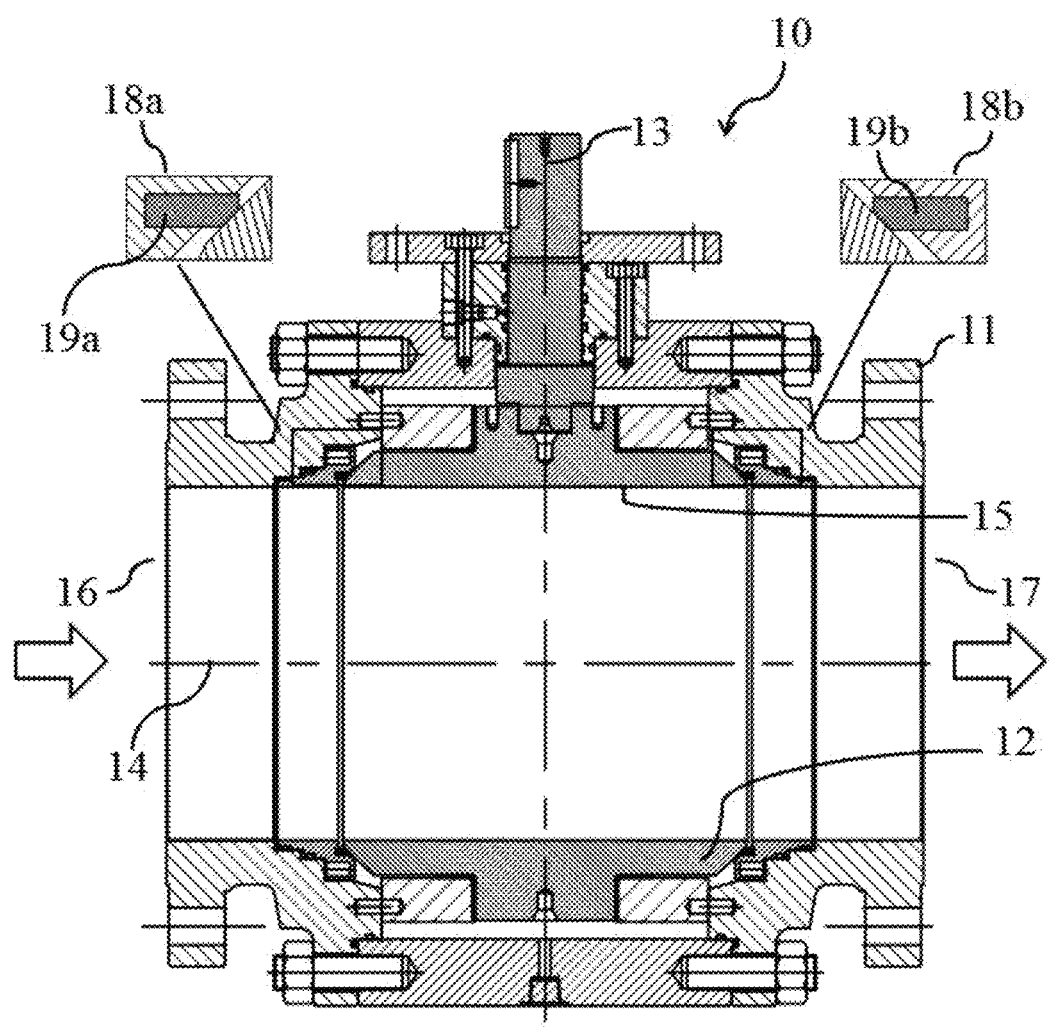
FIG. 1 gives internal general view of a rotary ball valve employing a seat ring on an upstream side and another seat ring on a downstream side.

FIG. 1 shows a rotary ball valve (10). The rotary ball valve (10) comprises of a valve body (11) and a rotary ball (12). The rotary ball (12) is rotatable around a Y-axis (13) while a fluid flows along an X-axis (14). The rotary ball (12) has a cylindrical hole (15), which is co-axial with the X-axis (14) when the rotary ball valve (10) is open so as to allow flow of the fluid through the cylindrical hole (15). The cylindrical hole (15) is orthogonal to the X-axis (14) as well as orthogonal to the Y-axis (13) when the rotary ball valve (10) is closed. The fluid approaches the rotary ball valve (10) from an upstream side (16) and leaves the rotary ball Valve (10) from a downstream side (17). A first seat ring (19a) sits in a first cavity (18a) on the upstream side (16) and a second seat ring (19b) sits in a second cavity (18b) on the downstream side (17).

Whenever the term "seat ring" is used, it implies a first seat ring and a second seat ring. Similarly, "cavity" implies a first cavity and a second cavity.

The present invention shall be further described considering a preferred embodiment of a known trunnion type rotary ball valve, wherein the rotary ball is held firmly by a plurality of trunnions co-axial with Y-axis. The first seat ring (19a) sitting in the first cavity (18a) and the second seat ring (19b) sitting in the second cavity (18b) is resiliently mounted such that the seat ring on the upstream side presses against the surface of the rotary ball harder when the rotary ball valve is closed, in other words, when a fluid entering from the upstream side is prevented from flowing out of the downstream side.

As shall be clear, the present invention is equally deployable in floating type rotary ball valves where the rotary ball valve is floating and the first seat ring sitting in the first cavity and the second seat ring sitting in the second cavity are held firmly, and consequently the rotary ball presses against the second seat ring when the fluid enters from the upstream side and the rotary ball valve is closed.

Figure 2:
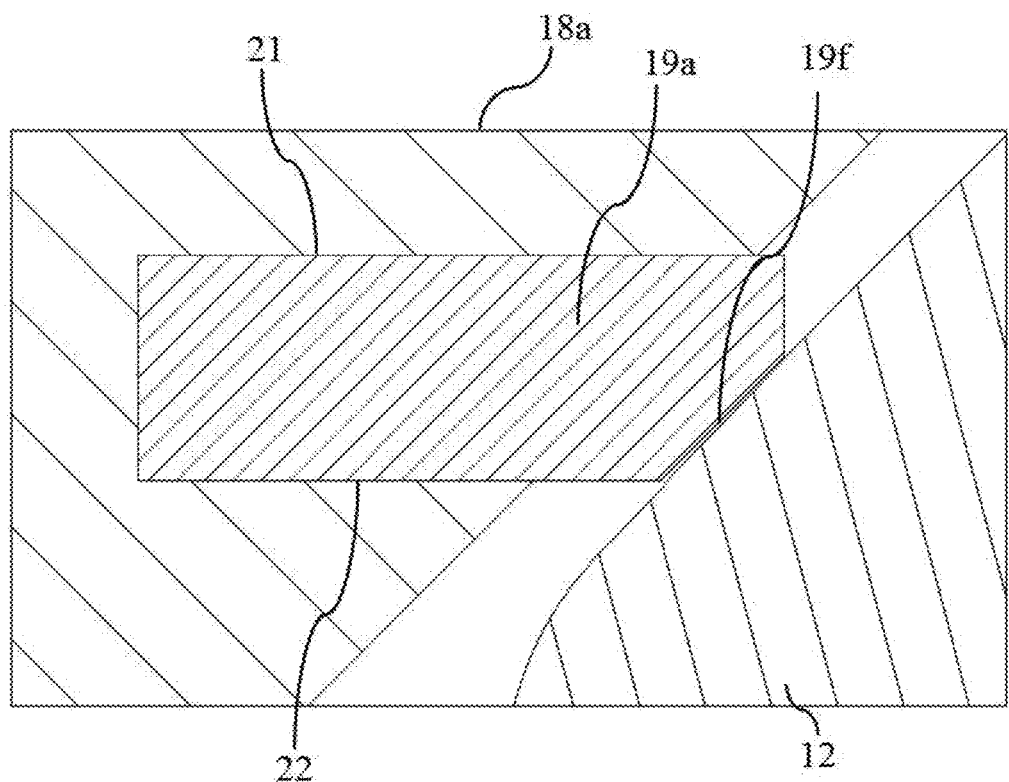
FIG. 2 is an enlarged sectional view of prior art of a portion of a ball valve seat showing a seat ring, a cavity of the seat ring and a rotary ball.

FIG. 2 shows an enlarged view of a prior art illustrating a first cavity (18a) wherein is sitting a first seat ring (19a) and an external face (19f) of the first seat ring (19a) is resting against the rotary ball (12) of the rotary ball valve (10). As can be noted, the first seat ring (19a) as also the second seat ring (not shown here) has two concentric substantially parallel surfaces, a first parallel surface (21) and a second parallel surface (22), which are seen as a rectangular profile in the sectional view. The first seat ring (19a) as also the second seat ring (not shown here) is slightly over dimensioned and the first seat ring (19a) is force fitted into the first cavity (18a) and the external face (19f) of the seat ring (19a) which rests on the rotary ball (12) is machined to generate a sealing surface between the external face (19f) and the rotary ball (12).

Figure 3:
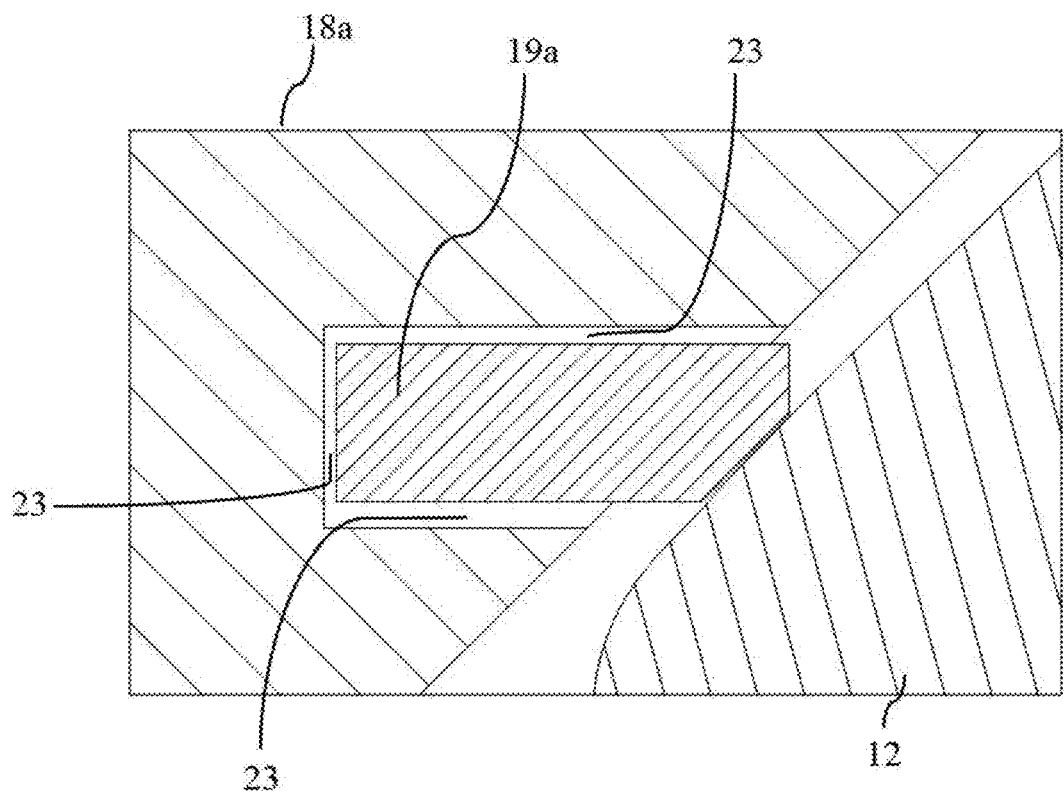
FIG. 3 is an enlarged sectional view of prior art showing exaggeratedly the leakage path around a periphery of a seat ring in the cavity of the seat ring, caused due to temperature cycling.

In actual use, a rotary ball valve (10) encounters cyclic temperature variations due to ambience and medium. A co-efficient of expansion and contraction of the seat ring, which is made of a plastic material, is six to ten times higher than a co-efficient of expansion of the cavity, which is made of a ferrous material. A reduction in temperature results in the seat ring shrinking and an increase in temperature results in fall of work hardness of the seat ring. Consequent to repeated decrease and increase of temperature the set ring loosens in the cavity and a narrow and continuous leak path (23) gets created in prior art designs as exaggeratedly shown in FIG. 3. When the rotary ball valve (10) is used to carry gaseous fluid at low pressure, the loosened seat ring is altogether ineffective.

Figure 4:
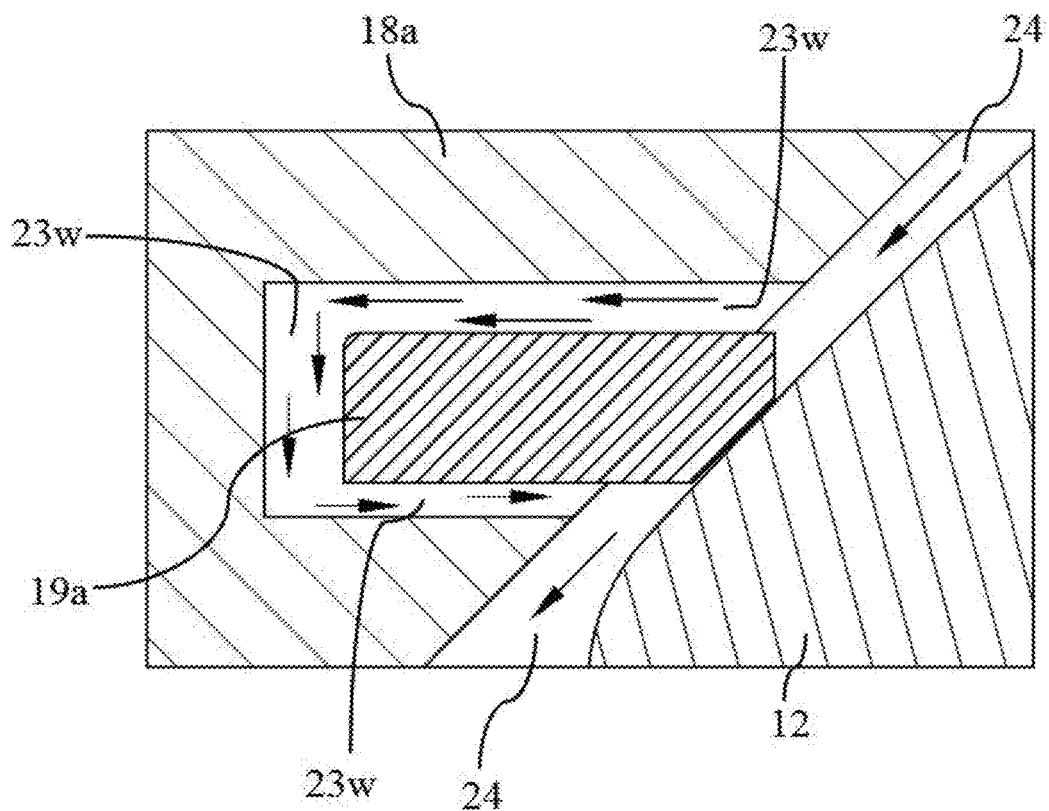
FIG. 4 is an enlarged sectional view of prior art showing fluid leakage path causing further dislodging of the seat ring from a cavity in double block and bleed condition.

FIG. 4 describes that the effect of thermal cycling is worse in the situations of double block and bleed condition. The rotary ball valves which seal from both sides, that is, from upstream side as well as from downstream side, are generally provided with a bleeding feature so as to relieve the excessive pressure caused due to transient pressure spikes. Ideally, in the event of presence of a transient pressure pulse, the pressure spike is expected to push back the first seat ring (19a) along with the first cavity (18a) so as to allow flow of fluid (24), technically termed as bleeding of fluid, momentarily. However, consequent to loosened seat ring, a transient pressure spike pushes away the first cavity (18a) itself, thereby widening the leakage path (23w) and dislodging the first seat ring (19a) further away and out from the first cavity (18a).

Figure 5:
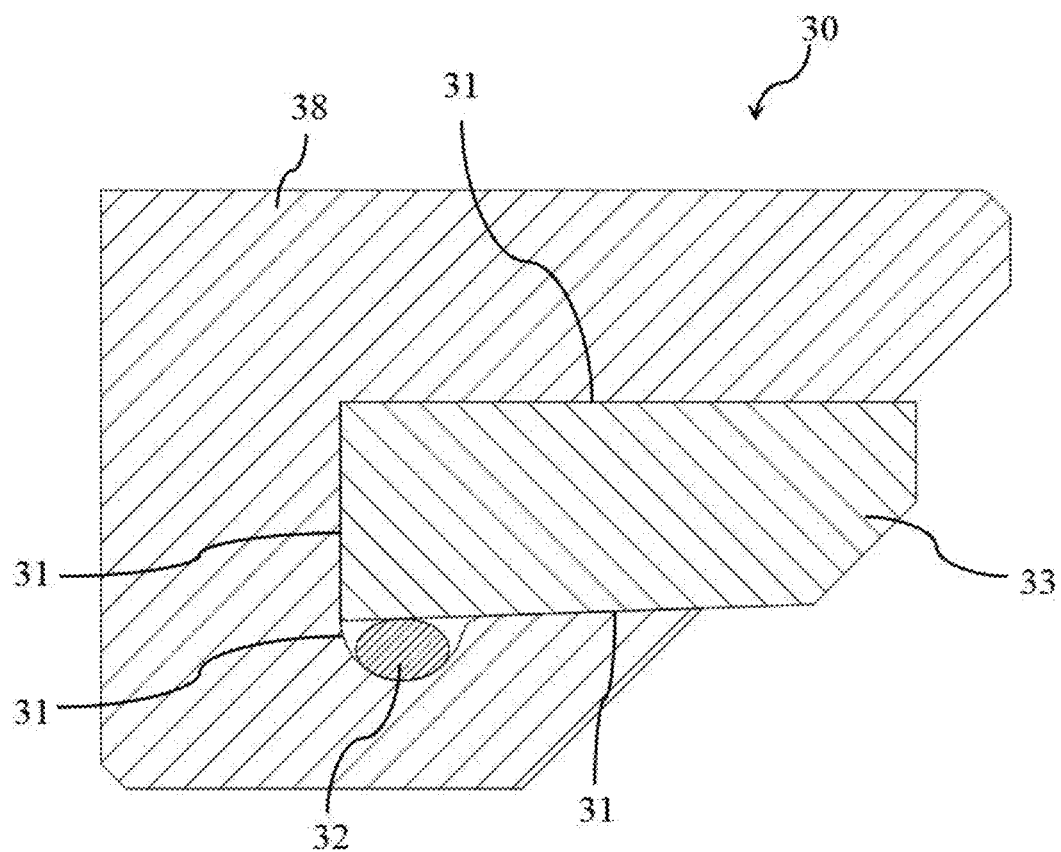
FIG. 5 is an enlarged sectional view of a combination sealing arrangement as per present invention.

FIG. 5 shows a section of a combination sealing arrangement (30) as per present invention. A rotary ball valve (10), similar to the one shown in FIG. 1, has a combination sealing arrangement (30) on the upstream side and another combination sealing arrangement (30) on the downstream side. The combination sealing arrangement (30) comprises of a seat support (38) having a polarized combination cavity (31), in which is assembled an add-on sealing ring (32) and a compatible seat ring (33) having a plurality of non-parallel concentric surfaces, when assembled. The compatible seat ring (33) is of a relatively tougher elastomer like PTFE while the add-on sealing ring (32) is made of VITON or neoprene or equivalent synthetic rubbers considering fluid compatibility as per the application. This implies that when the add-on sealing ring (32) and the compatible seat ring (33) are pressed together against each other, the add-on sealing ring (32) shall elastically deform.

The term "compatible" signifies that the assembled dimension of the compatible seat ring (33) is such that the add-on sealing ring (32) is deformed within limits as per known formulae, like Lindly's Relation.

The compatible seat ring (33) has a compatible profile so as to create a positive isolation by a surface contact between the add-on sealing ring (32) and an extended groove and create another positive isolation by a surface contact between the add-on sealing ring (32) and the compatible seat ring (33). This shall be further described below.

Figure 6:
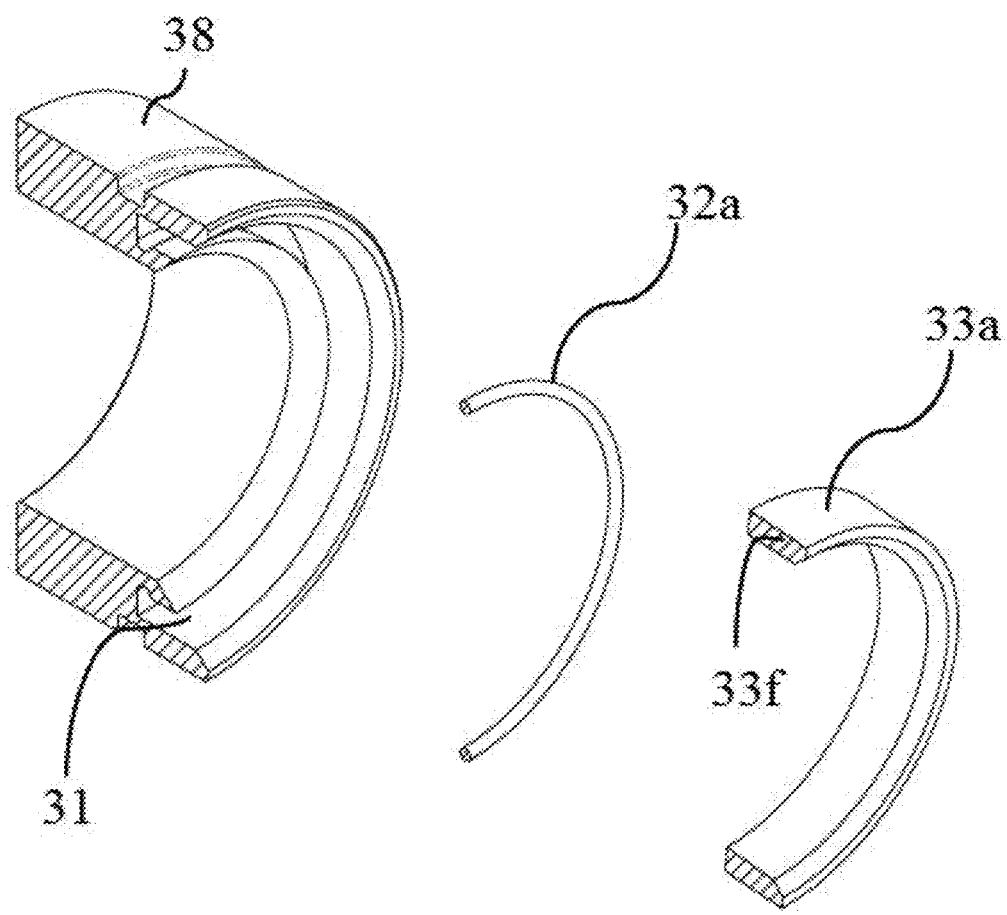
FIG. 6 is a perspective view of a seat support having a polarized combination cavity, a compatible seat ring and an add-on sealing ring, which when assembled, results into a combination sealing arrangement as per present invention.
Figure 7A:
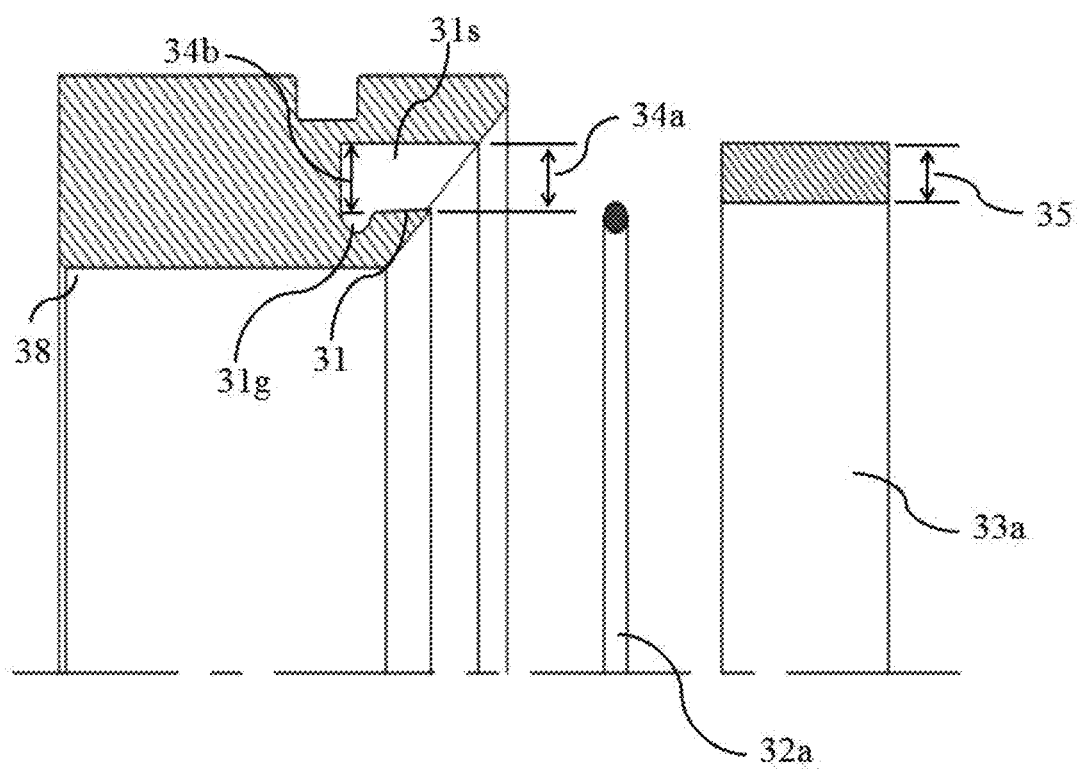
FIGS. 7A and 7B is a sectional view of a seat support having a polarized combination cavity, a compatible seat ring and an add-on sealing ring in disassembled to assembled stages.
Figure 7B:
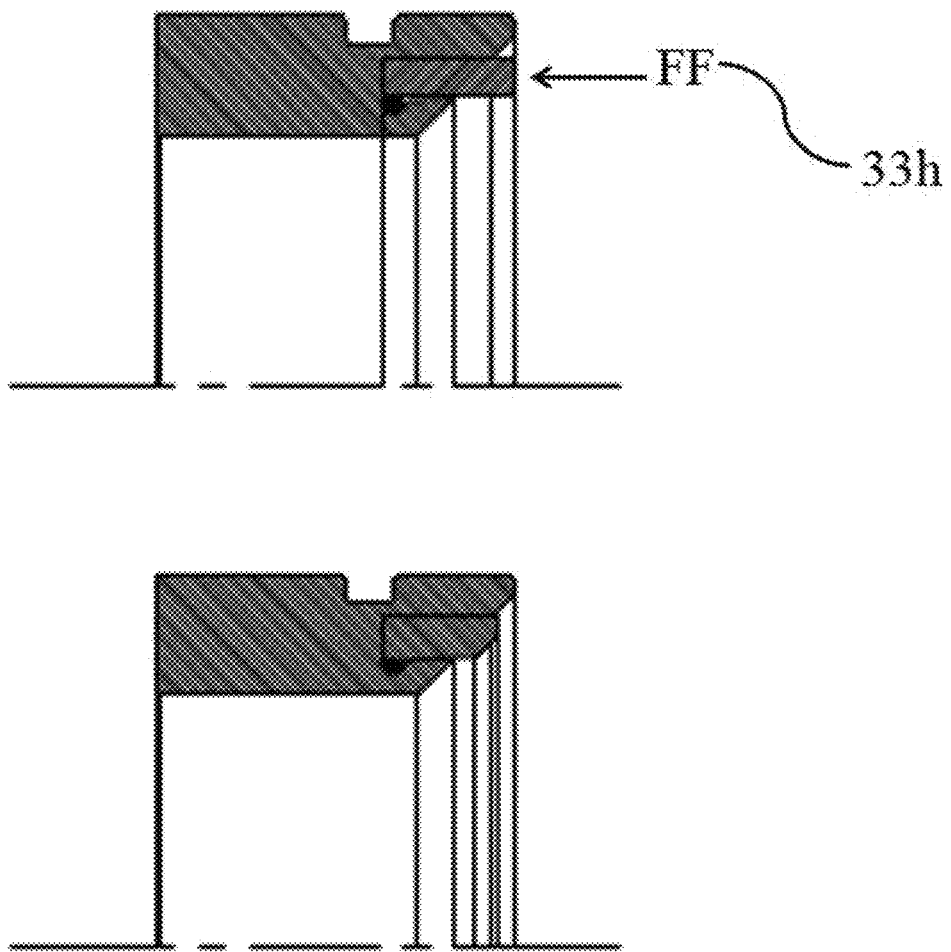

As shown in FIGS. 6, 7A and 7B, the polarized combination cavity (31) has a non-parallel slot (31s) and an extended groove (31g). The extended groove (31g) is relatively dimensioned such that when an add-on sealing ring (32a) is slipped in the polarized combination cavity (31), the add-on sealing ring (32a) shall have the tendency to stay in the extended groove (31g), and the add-on sealing ring (33a) shall slightly project into the non-parallel slot (31s).

The polarized combination cavity (31) further comprises of the non-parallel slot (31s). The non-parallel slot (31s) is of an entrance width (34a) which is less than a thickness (35) of the compatible seat ring (33a) and the compatible seat ring (33a) is having a plurality of parallel concentric surfaces initially. The entrance width (34a) is merely marginally less than the thickness (35) such that the compatible seat ring (33a) can be force fitted in the non-parallel slot (31s).

The root width (34b) of the non-parallel slot (31s) is more than the entrance width (34a) of the non-parallel slot (31s) as well the thickness (35) of the compatible seat ring (33a).

Term "polarized" signifies that the "room" to accommodate the add-on sealing ring (32a) and the compatible seat ring (33a) is (a) broader at the root than at the entrance, and (b) asymmetrical. Such polarization ensures that the add-on sealing ring and the compatible seat ring, once assembled properly, cannot be disassembled easily.

To assemble the combination sealing arrangement (30), first of all the add-on sealing ring (32a) is slipped in to the extended groove (31g). As is known, the add-on sealing ring (32a) is merely stretched slightly and just left in the extended groove (31g) and the add-on sealing ring (32a) slips in the extended groove (31g) due to commensurate profile of the extended groove (31g), and now, in stretched mode, is termed the add-on sealing ring (32).

The compatible seat ring (33a) is pre-heated so as to temporarily reduce its intrinsic hardness to about 20% to 50% and then force fitted into the non-parallel slot (31s) by applying a force FF (33h), as shown in FIG. 7B, on the face (33f) of the compatible seat ring (33a). Since the root width (34b) of the non-parallel slot (31s) is more than the entrance (34a), the compatible seat ring (33a) swells while the force FF (33h) is applied on the face (33f) and the compatible seat ring (33a) fills and fits in the non-parallel slot (31s) non-reversibly; and the compatible seat ring (33a) having a plurality of parallel surfaces turns into a compatible seat ring (33) having a plurality of non-parallel surfaces as shown in FIG. 5.

Consequent to applying the force FF (33h) on the face (33f) of the compatible seat ring (33a), the face (33f) gets irregular and deformed (not shown), which is subsequently machined as per the curvature of the rotary ball (12), so as to create a perfect sealing between the face (33f) and the rotary ball (12).

Figure 8:
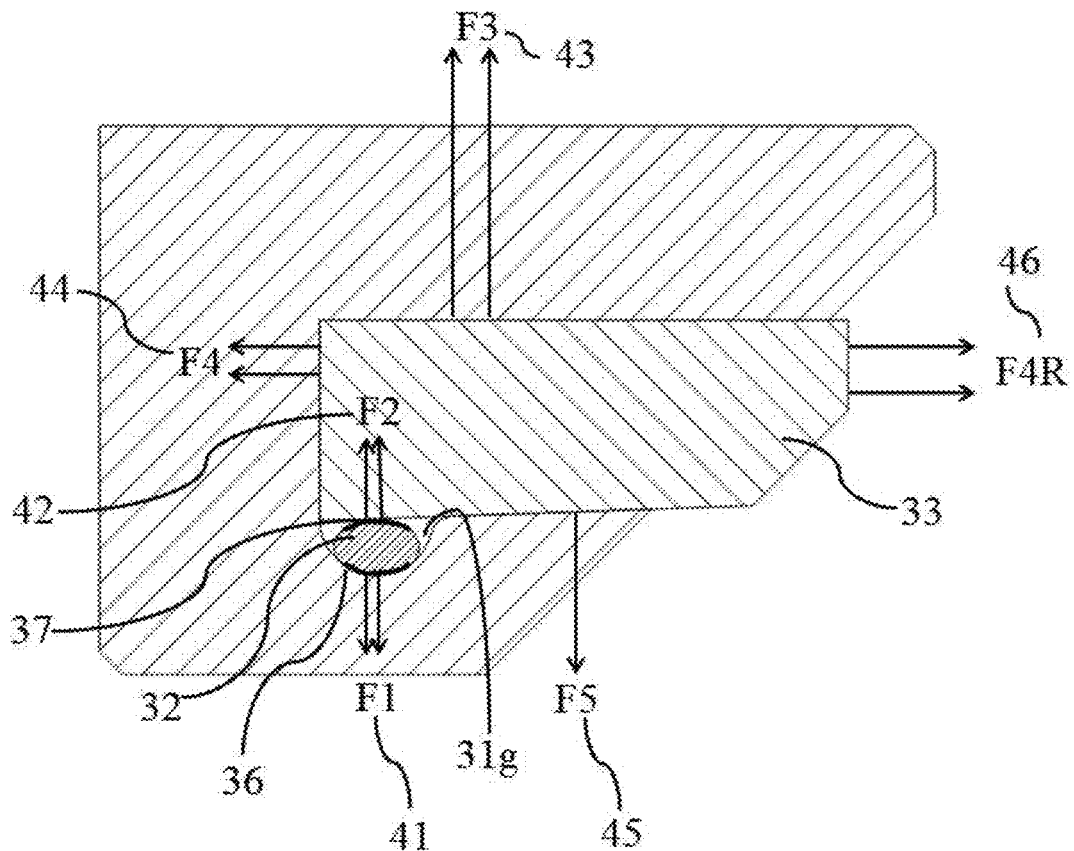
FIG. 8 shows a force distribution in a combination sealing arrangement.

As shown in FIG. 8, the add-on sealing ring (32) applies a first push force F1 (41) on the extended groove (31g) and a second push force F2 (42) on the compatible seat ring (33). The compatible seat ring (33) with non-parallel concentric surfaces exerts a third push force F3 (43), an outward force F4 (44) and a fourth push force F5 (45). The outward force F4 (44) results into a reaction force F4R (46) with a tendency to push the compatible seat ring (33) out of the non-parallel slot (31s). However, the non-parallelity of the non-parallel slot (31s) effectively neutralizes the reaction force F4R (46). Consequently, in spite of thermal cycling, although the leakage path (23) still gets created, however, the compatible seat ring (33) with non-parallel concentric surfaces stay puts in its position and does not dislodge outwards.

Consequent to the first push force F1 (41) and the second push force F2 (42), there remains a positive isolation due to a surface contact in the groove region (36) between the add-on sealing ring (32) and the extended groove (31g), and at region of contact (37) between the add-on sealing ring (32) and the compatible seat ring (33).

Figures 9A, 9B:
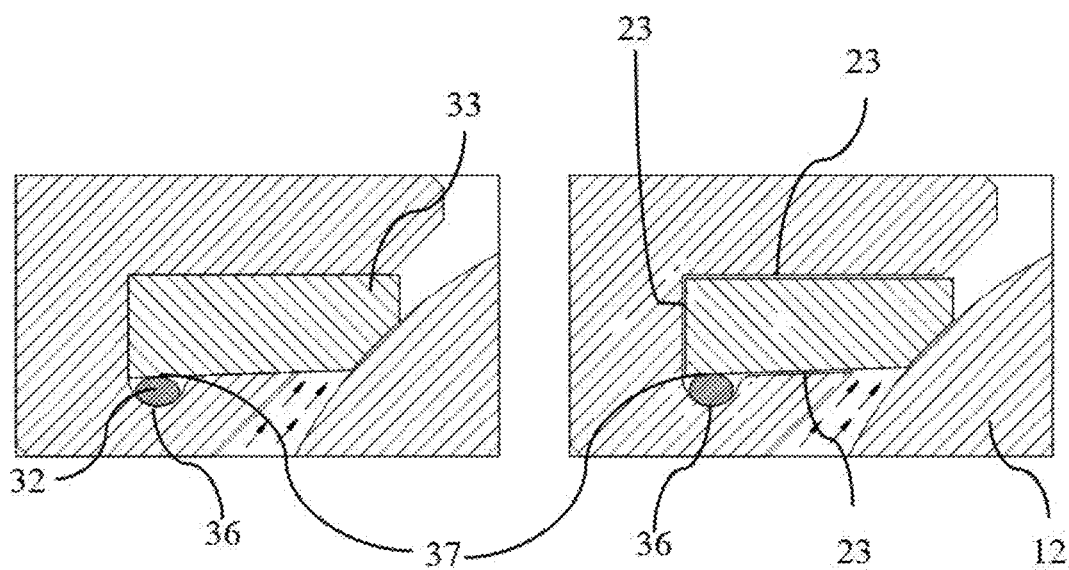
FIGS. 9A and 9B show the combination sealing arrangement at an upstream side for trunnion type rotary ball valve.

As shown in FIGS. 9A and 9B, in case of a trunnion type rotary valve, even when thermal cycling causes the leakage path (23) around the compatible seat ring (33) in the upstream side, the positive isolation in the groove region (36) and at the region of contact (37) breaks the continuity of the leakage path and thus leakage is prevented.

Figure 10A:
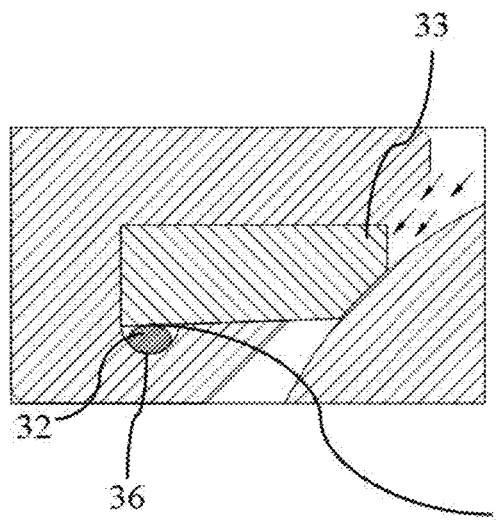
FIGS. 10A and 10B show the combination sealing arrangement at a downstream side for a floating ball type rotary valve.
Figure 10B:
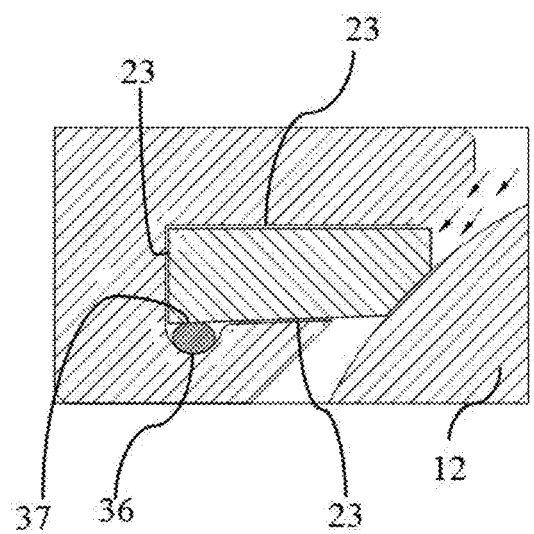

As shown in FIGS. 10A and 10B, in case of a floating type rotary valve, even when thermal cycling causes a leakage path (23) around the compatible seat ring (33) in the downstream side, the positive isolation in the groove region (36) and at the region of contact (37) breaks the continuity of the leakage path and thus leakage is prevented.

Figure 11:
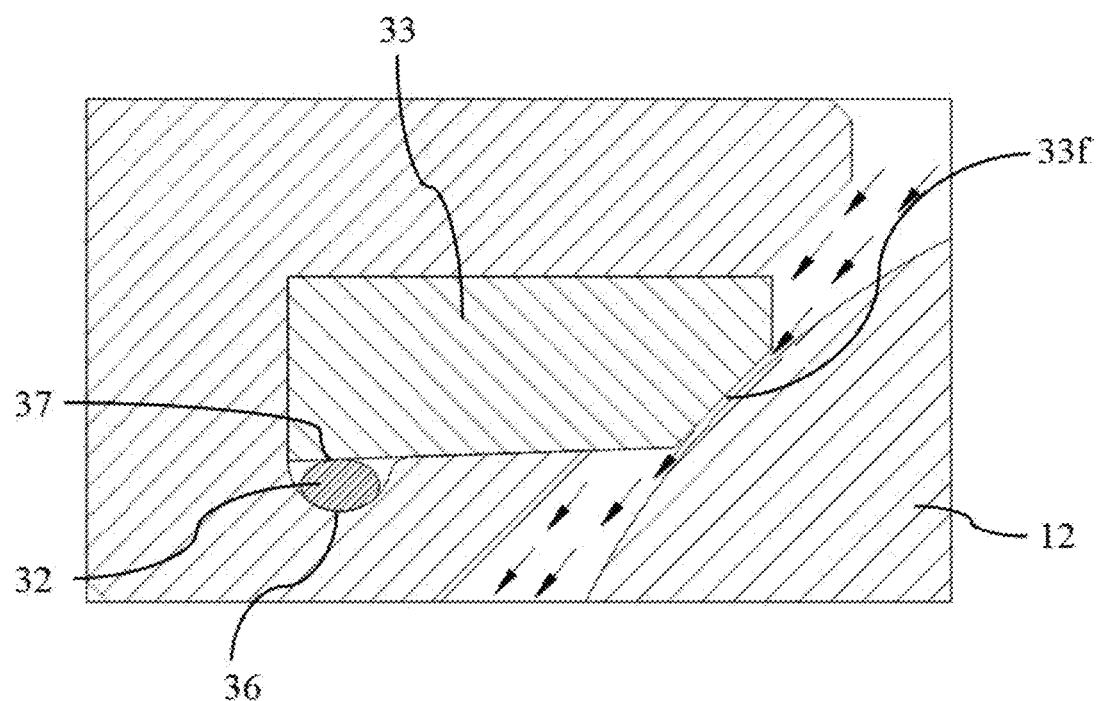
FIG. 11 shows the combination sealing arrangement illustrating momentary situation of pressure relieving in double block and bleed condition.

As shown in FIG. 11, in double block and bleed condition, even when thermal cycling causes a leakage path around the compatible seat ring (33), the compatible seat ring (33) stay puts in its position due to non-parallel concentric surfaces; and the positive isolation in the groove region (36) and at the region of contact (37) prevents leakage. Consequently, the compatible seat ring (33) is momentarily pushed back due to pressure spike, permitting the desired bleed action of fluid flowing from in-between the face (330 of the compatible seat ring (33) and the rotary ball (12).

Figure 12:
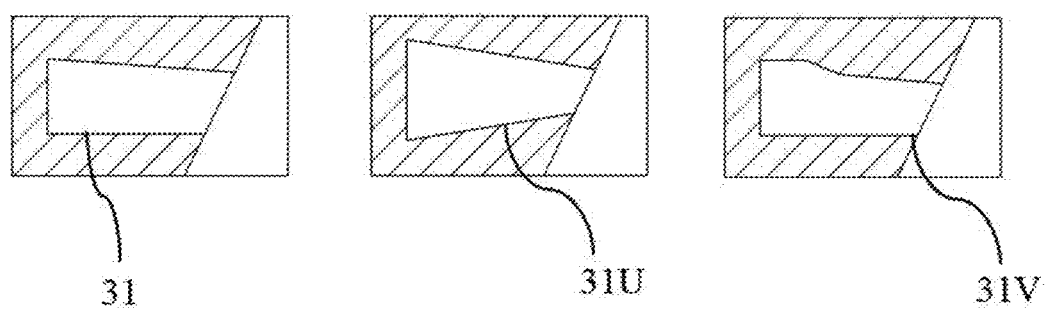
FIG. 12 shows embodiments of polarized combination cavity.
Figure 13:
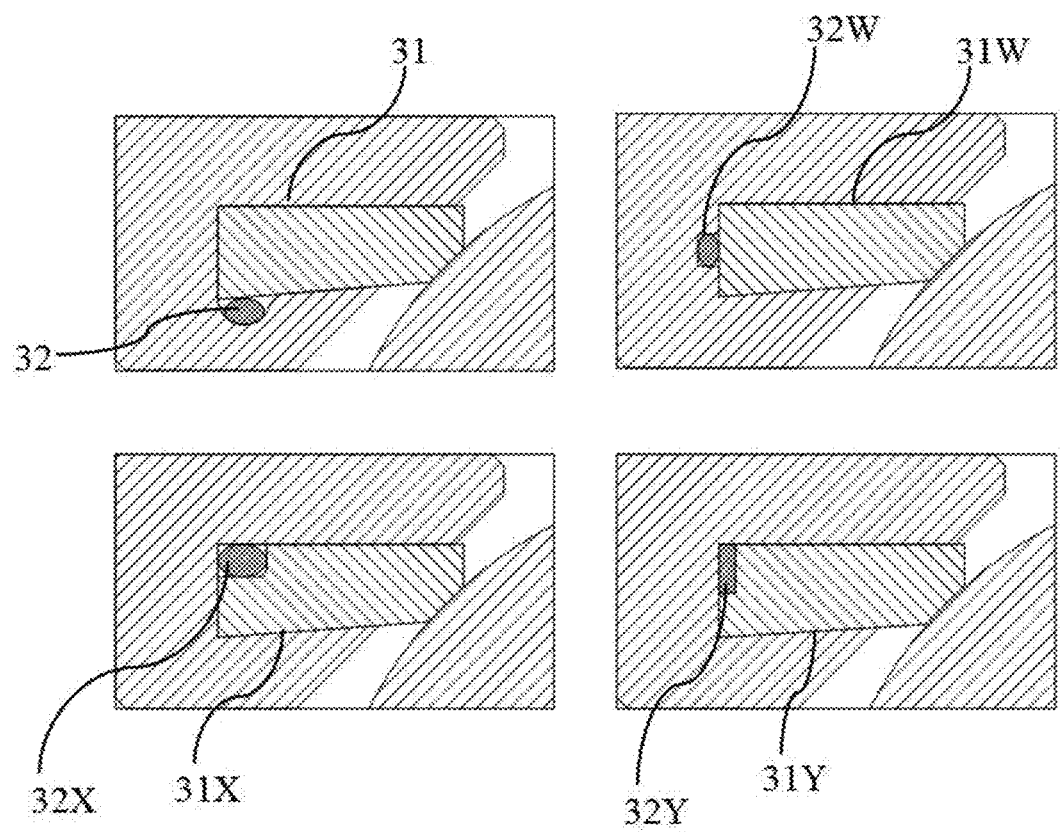
FIG. 13 shows a polarized combination cavity with different embodiments of add-on sealing ring.

FIG. 12 shows some of the several possible profiles of polarized combination cavity (31, 31U, 31V) and FIG. 13 shows the polarized combination cavities (31, 31W, 31X, 31Y) with different embodiments of add-on sealing ring (32, 32W, 32X, 32Y) and at different locations in the polarized combination cavity (32, 32W, 32X, 32Y). The add-on sealing ring (32, 32W, 32X, 32Y) can be of any shape, like an O-ring, a non-circular gasket or any combination thereof. The method to assemble the add-on sealing ring in the extended groove may marginally vary accordingly.

The term extended groove signifies a room for an add-on sealing ring; the room can be within the slot or outside the slot.

The invention claimed is:

1. A method to assemble a combination sealing arrangement in a rotary ball valve comprising of a valve body, a rotary ball, the method comprising the steps of:
   (i) stretching an add-on sealing ring up to an extended groove of a seat support with a polarized combination cavity;
   (ii) slipping the add-on sealing ring into the extended groove of the seat support with the polarized combination cavity;
   (iii) pre-heating a compatible seat ring having a plurality of non-parallel concentric surfaces, when assembled so as to temporarily reduce its intrinsic hardness to 20% to 50%;
   (iv) fitting the compatible seat ring forcibly into a non-parallel slot the seat support with the polarized combination cavity by applying a force FF on a face of the compatible seat ring;

(v) filling of the non-parallel slot of the seat support with the polarized combination cavity by the compatible seat ring; and (vi) machining the face of the compatible seat ring as per a curvature of the rotary ball.

2. The method to assemble the combination sealing arrangement in the rotary ball valve as claimed in claim 1, wherein the slipping of the add-on sealing ring and the fitting of the compatible seat ring includes pressing of the add-on sealing and the compatible seat ring against each other causes deforming elastically the add-on sealing ring.

3. The method to assemble the combination sealing arrangement in the rotary ball valve as claimed in claim 1, wherein the fitting of the compatible seat ring includes providing a compatible profile for creating a positive isolation by a surface contact between the add-on sealing ring and the extended groove of the seat support, and between the add-on sealing ring and the compatible seat ring.

4. The method to assemble the combination sealing arrangement in the rotary ball valve as claimed in claim 1, wherein the fitting of the compatible seat ring into the non-parallel slot includes producing non-parallel concentric surfaces.

5. The method to assemble the combination sealing arrangement as claimed in claim 1, wherein the slipping of the add-on sealing ring includes applying a first push force F1 on the extended groove of the seat support and a second push force F2 on the compatible seat ring.

6. The method to assemble the combination sealing arrangement as claimed in claim 5, wherein applying the first push force F1 includes causing a positive isolation due to a surface contact in a groove region between the add-on sealing ring and the extended groove of the seat support.

7. The method to assemble the combination sealing arrangement as claimed in claim 5, wherein applying the second push force F2 includes causing a positive isolation due to a region of contact between the add-on sealing ring and the compatible seat ring.

8. The method to assemble the combination sealing arrangement as claimed in claim 1, wherein the fitting of the compatible seat ring with the non-parallel concentric surface includes exerting a third push force F3, an outward force F4 and a fourth push force F5.

9. The method to assemble the combination sealing arrangement as claimed in claim 8, wherein exerting the outward force F4 includes providing a reaction force F4R with a tendency to push the compatible seat ring out of the non-parallel slot.

10. The method to assemble the combination sealing arrangement as claimed in claim 9, wherein providing the reaction force F4R resulting in neutralizing the reaction force F4R due to a non-parallelity of the non-parallel slot.

11. The method to assemble the combination sealing arrangement as claimed in claim 1, wherein the fitting of the compatible seat ring into a rotary ball valve comprises fitting into a double block and a bleed condition by
    momentarily pushing back the compatible seat ring due to a pressure spike;
    permitting a desired bleed action of a fluid flowing from in-between the face of the compatible seat ring and a face of the rotary ball valve,
    retaining the compatible seat ring in a selected position in the polarized combination cavity by providing non-parallel concentric surfaces of the compatible seat ring in a non-parallel slot; and
    providing a positive isolation in a groove region of the seat support and at a region of contact between the add-on sealing ring and the compatible seat ring.

12. The method to assemble the combination sealing arrangement as claimed in claim 1, further including providing the rotary ball valve with a trunnion mounted ball with a positive isolation in the groove region and at a region of contact in an upstream side, breaking a continuity of a leakage path.

13. The method to assemble the combination sealing arrangement as claimed in claim 1, further including providing the rotary ball valve with a floating ball with a positive isolation in a groove region and at a region of contact in a downstream side, breaking a continuity of a leakage path.

14. The method to assemble the combination sealing arrangement as claimed in claim 1, further including providing the extended groove and the add-on sealing ring of such a relative dimension that the add-on sealing ring has a tendency to stay in the extended groove.

15. The method to assemble the combination sealing arrangement as claimed in claim 1, further including providing the add-on sealing ring and the extended groove of such a relative dimension that the acid-on sealing ring slightly projects into the non-parallel slot.

16. The method to assemble the combination sealing arrangement as claimed in claim 1, further including providing the non-parallel slot having an entrance width less than a thickness of the compatible seat ring.

17. The method to assemble the combination sealing arrangement as claimed in claim 1, further including providing the non-parallel slot having a root width more than an entrance width and a thickness of the compatible seat ring.

18. The method to assemble the combination sealing arrangement as claimed in claim 1, further including providing the polarized combination cavity having different non-parallel shapes and profiles.

19. The method to assemble the combination sealing arrangement as claimed in claim 1, wherein the slipping of the add-on sealing ring is into a different location of the polarized combination cavity.

\* \* \* \* \*